Patented Mar. 12, 1929.

1,704,765

UNITED STATES PATENT OFFICE.

EMIL FRIEDRICH SCHELLER, OF LORSBACH IN TAUNUS, GERMANY.

PROCESS FOR MANUFACTURING ACTIVATED CHARCOAL.

No Drawing. Application filed May 2, 1927, Serial No. 188,399, and in Germany May 3, 1926.

My invention refers to the production of activated charcoal or carbon which shows an extraordinarily high activity. It consists in treating suitable starting materials such as wood, saw dust, cellulose, peat, starch, sugar, lignite and the like or mixtures of such materials with sodium monoxide at elevated temperatures. The process is advantageously carried out whilst the air is excluded as far as possible. It may therefore be executed in vacuo or in an indifferent atmosphere such as nitrogen. The proportions of carbonaceous starting materials and sodium oxide which are best suited for obtaining an optimum of efficacy have to be ascertained in each case by experiment.

The process may be started by heating the mixture at one end whereupon it proceeds automatically and very speedily without further addition of heat being necessary. When carbonaceous substances which contain at the same time oxygen and hydrogen are treated in the way prescribed, the process may be started in a very simple way by touching the mixture with a heated wire or the like or by introducing it into a heated vessel.

The sodium oxide may be applied also in conjunction with other materials, for instance, in mixture with neutral or alkaline substances which are inert towards sodium monoxide. Preferably such substances may be used which subsequently can be removed from the finished activated charcoal by washing with water or with acids or with solutions of acid substances. Such additional substances are common salt, potassium chloride, sodium hydroxide, sodium carbonate and the like. A mixture of sodium oxide with the said additional substances is preferably used in such cases in which a too violent reaction has to be avoided.

My invention may be effected by carbonizing carbonaceous starting materials such as wood, starch and the like and simultaneously activating them with sodium oxide. These starting materials are preferably solid carbonaceous materials in lumpy or pulverized form, which have not been oxidized or only partly so. Furthermore a finished charcoal such as wood charcoal may be activated according to my invention by treating it with sodium oxide, in such a way that finely comminuted wood charcoal mixed with suitable quantities of sodium oxide, or with mixtures containing sodium oxide is heated in vacuo or in an indifferent atmosphere to the temperature which is required for the activation. Finally, the activity of such charcoals as have previously been activated, may be increased according to my invention by the treatment with sodium oxide, or the activity of activated charcoals which has been exhausted or diminished by use may be re-established.

I found it advantageous in most cases to follow up by a heat treatment the process of activation proper..

In such cases in which the activation proper proceeds automatically after the reaction has been started the latter may be followed up by a short subsequent heating to red heat. In other cases in which finished charcoals such as wood charcoal have been activated or the activity of which has been enhanced by the treatment with sodium monoxide I found it useful to subject the mass subsequently to a prolonged heat treatment at temperatures which may advantageously range between 500 to 700° C.

The activated charcoals which have been obtained according to my invention may be liberated from alkali to a greater or less degree by the ordinary methods for instance by washing with water or solutions of acids or acid materials. It is known that activated carbons have been produced by treating carbonaceous starting materials either in a carbonized or noncarbonized state with sodium hydroxide or sodium carbonate at elevated temperatures. My process has compared with this known process the advantage that it proceeds automatically and with great speed as soon as the mixture is heated locally. In consequence the activation is finished in a much shorter time than when carried out according to the old process. Furthermore in carrying out my process a great saving of heat is obtained as no addition of heat is required as soon as the reaction has once been started. Only towards the end of the process slight heating is required. On the other hand my process may be carried out in very simple vessels and therefore the output of even a small plant is comparatively great.

The products produced according to my invention have an extraordinarily high activity. Comparative tests carried out with decolorizing carbons, produced by activation of carbonaceous material with sodium hydroxide at elevated temperatures such as may be obtained in the market under the trade name of "Eponit" have shown for instance that activated carbons obtained according to my invention have a decolorizing power six to eight times greater than "Eponit" when the decolorization tests are carried out under the same conditions.

The comparative decolorization tests have been carried out with a standard solution of molasses. This was obtained by diluting a certain quantity of molasses originating from the manufacture of sugar from beets with water until the colour shows 20° Stammer. About 55 grs. of ordinary molasses obtainable in the trade have been required to produce this colorization when diluted to about 1 ltr. As the ordinary molasses contain about 74, 5% of dry substance when their specific gravity is approximately 1.8 a solution of 20° Stammer contains approximately 1% of dry substance. Small variations in the properties of the molasses do not influence the decolorization to any appreciable extent as long as a solution of 20° Stammer is utilized.

1000 cc. of the solution of molasses is shaken with 1 gr. of kieselguhr and then filtered. This solution has to be prepared fresh each time as it does not keep.

The decolorization of the solution is carried out at 80° C. in a thermostat with agitation by adding the solution previously warmed to 80° C. to the weighed quantity of activated charcoal. The solution is shaken vigorously with the charcoal for ten minutes whereupon it is carefully filtered. As soon as the solution has been cooled down, decolorization compared with the original solution is ascertained in a colorimeter giving accurate results, for instance a Dubosq-colorimeter.

The activity of the decolorizing carbon is valued according to the quantity which is necessary to produce decolorization of 60% in 100 cc. of standard molasses solution under the conditions above mentioned.

The activated carbon manufactured according to my invention produces a decolorization of 60% when 1 gr. is used whilst of the decolorizing carbon "Eponit" obtained by heating carbonaceous materials with sodium hydroxide .6 to .8 g. are required.

What I claim is:

1. A process for producing carbon of high adsorptive quality, which consists in reacting carbonaceous material in mixture with sodium monoxide.

2. A process for producing carbon of high adsorptive quality, which consists in mixing carbonaceous material with sodium monoxide and heating the mixture.

3. A process for producing carbon of high adsorptive quality, which consists in mixing carbonaceous material with sodium monoxide and starting the reaction by igniting the mixture.

4. A process for producing carbon of high adsorptive quality, which consists in reacting carbonaceous material with sodium monoxide and heating the mass after the reaction has sudsided to red heat.

5. A process for producing carbon of high adsorptive quality, which consists in reacting carbonaceous material with sodium monoxide and heating the mass after the reaction has subsided to temperatures ranking from 500 to 700° centigrade.

6. A process for producing carbon of high adsorptive quality, which consists in reacting carbonaceous material with sodium monoxide and heating the mass after the reaction has subsided to temperatures of about 600° centigrade.

7. A process for producing carbon of high adsorptive quality, which consists in reacting carbonaceous material in mixture with sodium monoxide and removing the alkali by washing.

8. A process for producing carbon of high adsorptive quality, which consists in reacting carbonaceous material with sodium monoxide heating the reaction mass to red heat and washing out the alkali.

9. A process for producing carbon of high adsorptive quality which consists in bringing carbonized carbon-containing material into reaction with sodium monoxide.

10. A process of producing carbon of high adsorptive quality, which consists in reacting wood charcoal with sodium monoxide and heating the mass after the reaction has subsided to red heat.

11. Activated charcoals produced by the interaction of sodium monoxide and carbonaceous materials.

12. A process for producing carbon of high adsorptive quality which consists in carbonizing carbon-containing material and simultaneously bringing it into reaction with sodium monoxide.

13. A process of producing carbon of high adsorptive quality which consists in bringing carbonized carbon-containing material, which already has active properties, into reaction with sodium monoxide.

14. A process of producing carbon of high adsorptive quality which consists in bringing carbon-containing material into reaction with sodium monoxide in the presence of diluting substances.

15. A process of producing carbon of high adsorptive quality which consists in bringing carbon-containing material into reaction with sodium monoxide and soluble diluting substances, and in removing alkali with the diluting substances by washing from the activating carbon.

16. An activated carbon produced by the interaction of sodium monoxide and carbonaceous material characterized by the fact that 0.1 gram of it will produce a decolorization of 60% in 100 cc. of standard molasses solution as described.

Signed at Frankfort-on-the-Main, Germany this 20th day of April A. D. 1927.

EMIL FRIEDRICH SCHELLER.